United States Patent
Zhao et al.

(10) Patent No.: US 11,707,768 B2
(45) Date of Patent: Jul. 25, 2023

(54) SYSTEMS AND METHODS FOR PEANUT SORTING AND GRADING

(71) Applicant: University of Georgia Research Foundation, Inc., Athens, GA (US)

(72) Inventors: Zhuo Zhao, Athens, GA (US); Tsz Ho Tse, Norcross, GA (US); Don Leo, Bogart, GA (US); Kyle Johnsen, Athens, GA (US); Rui Li, Athens, GA (US); Brian L. Boland, Powder Springs, GA (US)

(73) Assignee: University of Georgia Research Foundation, Inc., Athens, GA (US)

( * ) Notice: Subject to any disclaimer, the term of this patent is extended or adjusted under 35 U.S.C. 154(b) by 19 days.

(21) Appl. No.: 17/491,961

(22) Filed: Oct. 1, 2021

(65) Prior Publication Data
US 2022/0105544 A1 Apr. 7, 2022

Related U.S. Application Data

(60) Provisional application No. 63/086,661, filed on Oct. 2, 2020.

(51) Int. Cl.
*B07C 5/342* (2006.01)
*G06T 5/00* (2006.01)
(Continued)

(52) U.S. Cl.
CPC ............ *B07C 5/3425* (2013.01); *G06T 5/002* (2013.01); *G06T 7/0004* (2013.01); *G06T 7/13* (2017.01);
(Continued)

(58) Field of Classification Search
CPC ................. B07C 5/3425; B07C 5/342; B07C 2501/0081
See application file for complete search history.

(56) References Cited

U.S. PATENT DOCUMENTS

| 2,519,643 | A | 8/1950 | Garrigue et al. |
| 9,731,328 | B2 * | 8/2017 | DeFillipi ................. B07C 5/363 |
| 10,099,259 | B2 * | 10/2018 | Anup ....................... B07C 5/36 |

FOREIGN PATENT DOCUMENTS

| CN | 109886948 A | * | 6/2019 |
| CN | 111250426 A | * | 6/2020 |

OTHER PUBLICATIONS

Bolder et al., Computer-Assisted Color Classification of Peanut Pods, Peanut Science, 29:41-46, 2002.
(Continued)

*Primary Examiner* — Michael McCullough
*Assistant Examiner* — Jessica L Burkman
(74) *Attorney, Agent, or Firm* — Thomas | Horstemeyer, LLP

(57) ABSTRACT

Various examples of a system for peanut sorting and grading are disclosed herein. The system for grading peanut maturity, can include: a sample feeder configured to supply individual peanuts to an imaging area; a sorting board comprising a plurality of chutes and a plurality of gates, each chute of the plurality of chutes designated for a grade of peanut; and program instructions to obtain the digital image of the individual peanut; determine the grade of the individual peanut; and sort the individual peanut based on the grade of the individual peanut. A method for grading peanut maturity, can include feeding an individual peanut to an imaging area; obtaining a digital image of the individual peanut; determining a grade of the individual peanut based on an average color; and sorting the individual peanut in a chute of a sorting board based on the grade of the individual peanut.

20 Claims, 10 Drawing Sheets
(2 of 10 Drawing Sheet(s) Filed in Color)

(51) Int. Cl.
*G06T 7/90* (2017.01)
*G06T 7/13* (2017.01)
*G06T 7/00* (2017.01)
*H04N 9/67* (2023.01)

(52) U.S. Cl.
CPC ........ *G06T 7/90* (2017.01); *B07C 2501/0081* (2013.01); *G06T 2207/10024* (2013.01); *G06T 2207/30128* (2013.01); *G06T 2207/30242* (2013.01); *H04N 9/67* (2013.01)

(56) References Cited

OTHER PUBLICATIONS

Buhler, Agricultural Seeds Sorting Solutions.
Carter et al., Pod Maturity in the Shelling Process, Peanut Science, 44:26-34, 2017.
Colvin et al., Consideration of peg strength and disease severity in the decision to harvest peanut in southeastern USA, Journal of Crop Improvement, vol. 32, No. 3, 287-304, 2018.
Colvin et al., Development of a Digital Analysis System to Evaluate Peanut Maturity, Peanut Science, 41:8-16, 2014.
Desai et al., Image Processing Method for Embedded Optical Peanut Sorting, I.J. Image, Graphics and Signal Processing, 2, 20-27, 2016.
Dowell, An Intelligent Automated System for Determining Peanut Quality, International Workshop on Intelligent Robots and Systems IROS '90, p. 237-241.
Feng et al., Study on Color Image Processing Based Intelligent Fruit Sorting System, Proceeding of the 5th World Congress on Intelligent Control and Automation, p. 4802-4805, Hangzhou, P.R. China, Jun. 15-19, 2004.
Guzman et al., Peanut Threshing and Shelling Machines for Community-Based Peanut Enterprises in Developing Countries, ASABE 2019 Annual International Meeting, Jul. 7-10, 2019.
Holaday et al., A Method for Estimating Peanut Maturity, Journal of Food Science, vol. 44, No. 1, 254-256, 1979.
Johnson et al., Evaluation of the Arginine Maturity Index (AMI) Method of Maturity Estimation for Virginia Type Peanuts, Peanut Science, p. 32-36.
Kim et al., Analysis of the Separating Performance of Peanut Harvester Sorting System, J. Fac. Agr., Kyushu Univ., 60 (1), p. 209-214, 2015.
Liu et al., Validation of a laser based in-line aflatoxin sorting technology in Spanish type raw peanut in factory-scale production conditions, J Food Saf., 39:e12611, p. 1-11, 2019.
Rehkugler et al., Apple Sorting with Machine Vision, Transactions of the ASAE, vol. 29(5), p. 1388-1397, 1986.
Rowland et al., Canopy Characteristics and their Ability to Predict Peanut Maturity, Peanut Science, 35:43-54, 2008.
Slay, Damage to Peanuts From Free-Fall Impact, p. 1-12, Jun. 1976.
Srinivasan et al., Three decades of managing Tomato spotted wilt virus in peanut in southeastern United States, Virus Research 241, 203-212, 2017.
Sorensen et al., X-ray Technology to Determine Peanut Maturity, Peanut Science, 47:38-45, 2020.
Turner et al., Factors Relating to Peanut Yield Increases After Seed Treatment with Bacillus subtilis, Plant Disease, p. 347-353, 1991.
Williams et al., A Non-Destructive Method for Determining Peanut Pod Maturity, Peanut Science, 8, p. 134-141, 1981.
Yequn et al., Fluorescent signal characteristics for sorting of peanut contaminated by aflatoxin, Transactions of the Chinese Society of Agricultural Engineering, vol. 32, No. 1, p. 187-192, 2016.

\* cited by examiner

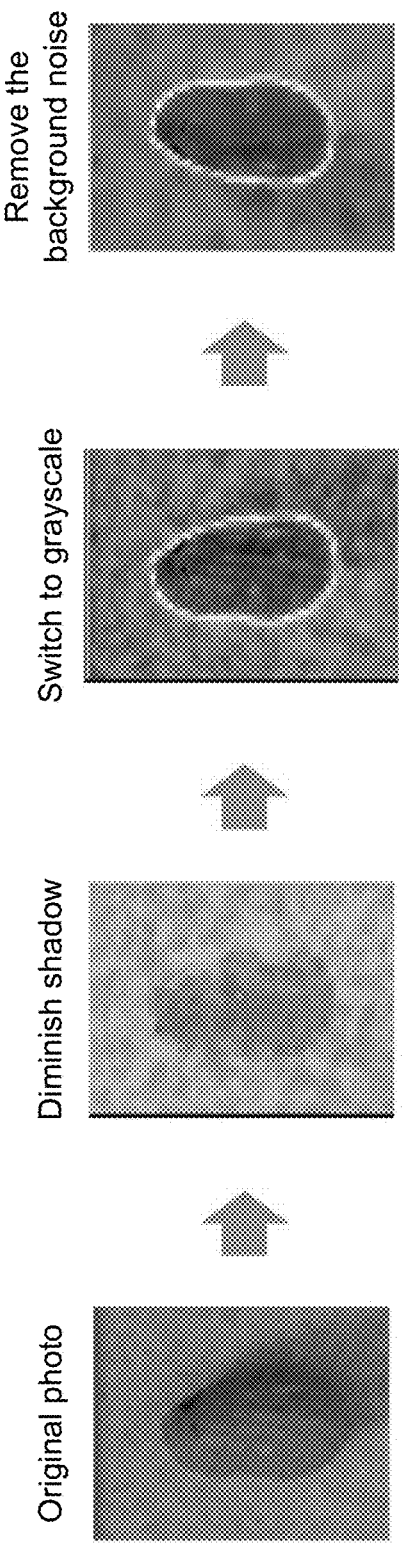
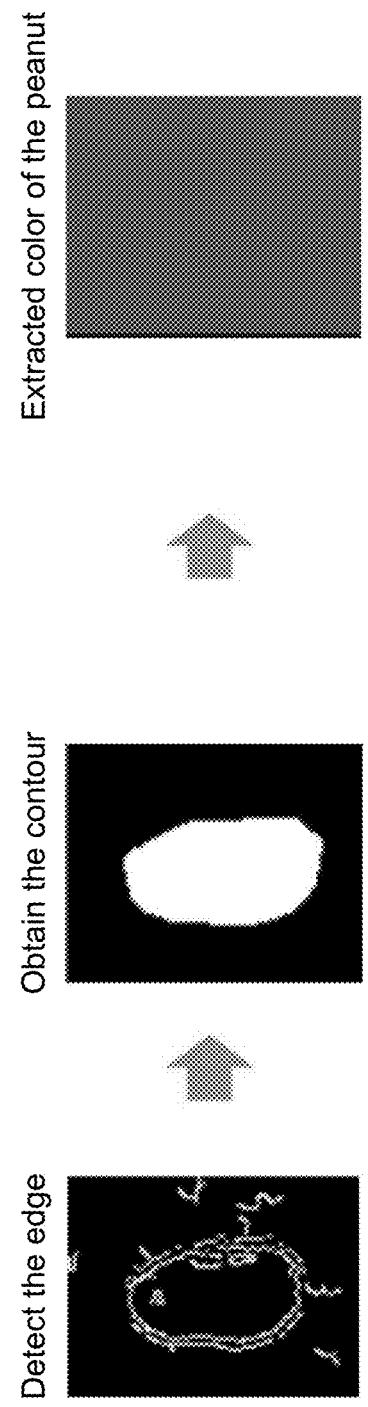

SYSTEMS AND METHODS FOR PEANUT SORTING AND GRADING

CROSS-REFERENCE TO RELATED APPLICATIONS

This application also claims priority to, and the benefit of, U.S. provisional application entitled "SYSTEMS AND METHODS FOR PEANUT SORTING AND GRADING" having Ser. 63/086,661 filed Oct. 2, 2020, which is incorporated by reference in its entirety.

BACKGROUND

Peanut is an important crop in the southern region of the United States. The Southeastern states of Georgia, Florida, Alabama, and Mississippi account for approximately two-thirds of national peanut production. Determining an optimum harvest maturity for peanuts is critical to the industry because it directly impacts the yield and quality of the peanuts. The conventional way of determining peanut maturity is a visual inspection method that can be time consuming and also is subject to variation due to the inherent nature of relying upon individual human inspectors, potentially generating unreliable or inconsistent results.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

The patent or application file contains at least one drawing executed in color. Copies of this patent or patent application publication with color drawing(s) will be provided by the Office upon request and payment of the necessary fee.

FIGS. 6A-6G illustrate an example images at corresponding to the process shown in FIG. 5 according to various embodiments disclosed herein.

DETAILED DESCRIPTION

Figure 1:
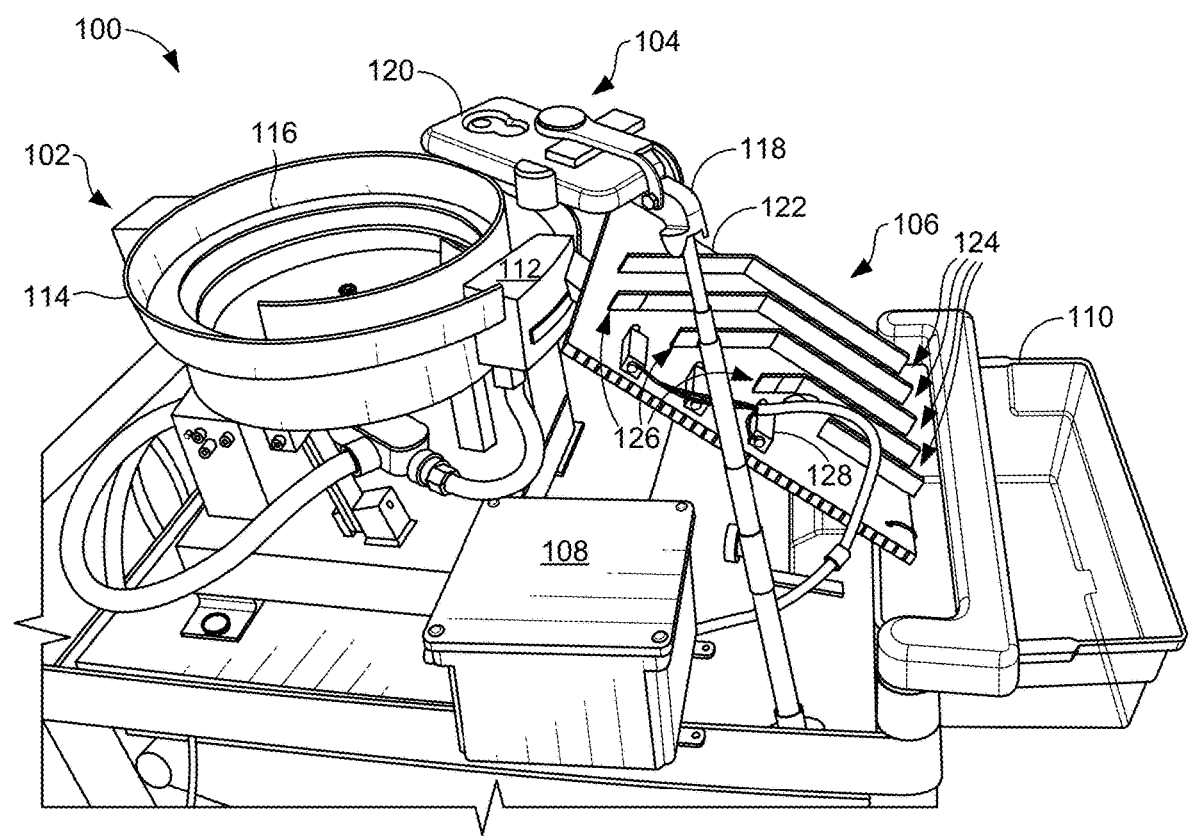
FIG. 1 illustrates an example system for sorting and grading a peanut sample according to various embodiments disclosed herein.

Described below are various embodiments of the present systems and methods for peanut sorting and grading therefor. Although particular embodiments are described, those embodiments are mere exemplary implementations of the system and method. One skilled in the art will recognize other embodiments are possible. All such embodiments are intended to fall within the scope of this disclosure. Moreover, all references cited herein are intended to be and are hereby incorporated by reference into this disclosure as if fully set forth herein. While the disclosure will now be described in reference to the above drawings, there is no intent to limit it to the embodiment or embodiments disclosed herein. On the contrary, the intent is to cover all alternatives, modifications and equivalents included within the spirit and scope of the disclosure.

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

The following examples are put forth to provide those of ordinary skill in the art with a complete disclosure and description of how to construct and use the systems and methods disclosed and claimed herein. Efforts have been made to ensure accuracy with respect to numbers (e.g., amounts, etc.), but some errors and deviations should be accounted for.

It is to be understood that, unless otherwise indicated, the present disclosure is not limited to particular materials, manufacturing processes, or the like, as such can vary. It is also to be understood that the terminology used herein is for purposes of describing particular embodiments only and is not intended to be limiting. It is also possible in the present disclosure that steps can be executed in different sequence where this is logically possible.

DISCUSSION

In the following discussion, a general description of the systems of the present disclosure and their components is provided, followed by a discussion of the method of operation of the same. A non-limiting example of the system for peanut sorting and grading is discussed.

As noted above, the Southeastern states of Georgia, Florida, Alabama, and Mississippi account for roughly two-thirds of the total national peanut production. Peanut is an important crop worldwide. Determining an optimum harvest maturity for peanuts is of importance because it directly impacts the yield and grade. Incorrectly assessing the peanut maturity at harvest could cause large economic loss not just to the peanut growers but to the food industry as a whole. Also, there is a good chance to reduce the aflatoxin level if the harvest time is optimal. Moreover, the mechanical loss or the digging loss can reach up to 40% if the peanuts are harvested outside the optimal time window.

To date, the most frequently used grading method is visual inspection of a peanut sample by trained individuals. For example, county agents, who assist the peanut growers with maturity testing, visit the growing sites and select representative peanut samples for further evaluation. The samples are placed onto a peanut profile board manually, and optimal digging day for the peanut is predicted by the trained individuals. For example, the grower digs a representative sample of 5 to 6 plants then delivers those plants to the local county extension agent, who conducts the maturity test. The agent removes all the peanuts from one plant and then proceeds to remove peanuts from successive plants until a total of 180 to 200 pods have been removed. The sample is placed in a mesh basket where the user removes the outer layer (exocarp) of the shell using a pressure washer with an oscillating nozzle. After the exocarp is removed, each peanut is visually inspected, sorted, and placed into columns on the peanut profile board according to the color of the exposed middle layer (mesocarp). Then the number of black peanuts, which represented a mature class, were used to estimate the harvest day. This process is time-consuming and subject to human errors due to differences in individuals' perception of color.

In the context of determining maturity of peanuts for harvest that can be employed on-site, various examples of peanut sorting and grading systems and methods that overcome one or more of the aforementioned deficiencies are described herein. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for grading peanut maturity configured to receive images of individual peanuts and classify each peanut based on the determined color. The system also includes a sample feeder, the sample feeder configured to supply individual peanuts of a plurality of peanuts of a peanut sample to an imaging area. The system also includes a sorting board, which may include a substrate, a plurality of chutes, and a plurality of gates. The system also includes a controller configured to actuate individual gates of the plurality of gates. Other embodiments of this aspect include corresponding computer systems, apparatus, and computer programs recorded on one or more computer storage devices, each configured to perform the actions of the methods.

In an example, an automated process can be used to select the black peanuts from a peanut sample, which is a class of ready-to-pick one. The system can first transport the peanuts using a feeder mechanism, such as a vibratory bowl, to align the peanuts into a line before directing to an automated sorter, which can separate the peanuts according to maturity level. The experimental results showed the accuracy of peanut counting was more than 87%. The average F1 score for peanut color sorting was greater than 90%.

Shown in FIG. 1, an example system 100 for peanut sorting and grading includes a sample feeder 102, an image capture system 104, a sorting board 106, and a controller 108. The system 100 can also include at least one container 110 to collect the sorted peanuts. The sample feeder 102 can be configured to receive a peanut sample comprising a plurality of peanuts (not shown) and supply individual peanuts of a plurality of peanuts of a peanut sample to an imaging area 112. As shown in FIG. 1, the sample feeder can be a vibratory bowl 114 adapted to receive the peanut sample into the bowl, where the vibrations of the vibratory bowl 114 align the peanuts to transport in the individual peanuts of the peanut sample along an inclined vibrational plane 116. In the example shown, the inclined vibrational plane 116 can be a spiral path along the interior wall of the vibrational bowl 114 that leads to an imaging area 112.

An image capture system 104 can comprise a camera 120 and a program code executable by at least one computing device being in data communication with the camera 120. When executed, the program code can direct the at least one computing device to at least capture, store, and classify digital images of individual peanuts of the peanut sample. The camera 120 can be configured to capture one or more images of an individual peanut positioned in the imaging area 112. In an example, the camera 120 can be within the computing device (e.g., a mobile computing device, such as, but not limited to a cellular telephone, smartphone, tablet, laptop, etc.). In an example, the camera can be separate/external to the computing device, but still in data communication with the computing device, where the camera 120 can communicate with computing device through a wired or wireless connection. The computing device(s) can comprise at least a processor and a memory. As will be described in further detail, the image capture system 104 can be configured to obtain an image, store the image in a memory of a computing device, detect and define at least an area that defines the peanut, determine a color to define the individual peanut, and classify the peanut. The computing device(s) can be configured to perform particular operations or actions by virtue of having software, firmware, hardware, or a combination of them installed on the system for which the operations cause the system to perform the aforementioned actions. One or more computer programs can be configured to perform particular operations or actions by virtue of including instructions that, when executed by a computing device, cause the computing device to perform the actions.

The system 100 can also include a sorting board 106 and a controller 108. The sorting board 106 can include a substrate 122, a plurality of chutes 124, and a plurality of gates 126. The sorting board 106 can be configured to receive individual peanuts from the imaging area 112. The number of chutes 124 are can be configured to correspond with the number of categories or colors of the classification. For example, if the classification is configured to distinguish 25 colors, the sorting board can have 25 chutes to correspond with the 25 colors. In the example shown in FIG. 1, the sorting board 106 is shown with four chutes 124 to sort four example color classifications. The sorting board 106 can also comprise a plurality of gates 126 and a corresponding plurality of actuators 128 configured to direct the peanut to a specified chute based on the determined color classification. In the example shown in FIG. 1, the sorting board 106 is shown with three gates 126. The gates 126 can be opened and closed by the actuators 128, which are connected to a controller configured to actuate individual gates of the plurality of gates. The controller 108 can communicate with the at least one computing device through a wired or wireless connection to receive instructions regarding the combination of individual gates to actuate to direct the peanut to a specified chute based on the color classification determined from the captured image of the corresponding individual peanut.

For example, the image capture system can comprise a smartphone for image capture and include software for color classification and gate activation for sorting. For example, the sample feeder can be a mechanism of bowl vibration (e.g. a vibratory feeder) or other mechanical feeder configured to receive a plurality of peanuts, orient the peanuts, and align the peanuts. The sample feeder is configured to feed the individual peanuts to an imaging area. In the example shown, the mechanism of bowl vibration is configured to align the peanuts into a line before entering the automated sorter, which is configured to separate the peanuts based on color appearance. For example, the vibrational bowl can transport 200 peanuts to the automated sorter in less than 5 minutes. As can be understood, other mechanisms for feeding a sample can be used, including but not limited to: rotational/linear vibrational feeders, gravitational feeders, conceptual force feeders, and mechanical push feeders.

The system for peanut sorting and grading can include software for color classification and gate activation for sorting. A digital image can be obtained at the imaging area before the peanut is moved to a sorting board. The image capture system can comprise a digital camera to capture a digital image. In an example, the digital camera may be a mobile device or a smartphone. The individual peanut is moved to the sorting board and sorted by color based on the captured digital image. For example, the sorting board can include gates which are actuated by a controller to sort the peanuts based on the color classification of the captured image. For example, the sorting board can be a 3D-printed sorting board with a number of chutes corresponding to grades or colors of peanuts. For example, a traditional peanut profile board can be used to select and/or extract colors for grading based on color appearance. In an example, the colors may be sorted into broad classes based on colors such as black, brown, orange, and yellow. In another example, further classes may be distinguished, such as cool black, light black, dark brown, light brown, orange, and yellow. In another example, the class may provide for 25 or more colors based on the natural colors of peanuts with respect to a traditional peanut profile board. The color sorting process can be further refined by collecting and storing individual images for machine learning to improve the accuracy of the sorting and grading process.

In the example shown in FIG. 1, the sample feeder is a bowl feeder that can be configured to ensure the peanut sample can be aligned and scanned one by one. The bowl feeder in this example had an optimal operating voltage of 90 V, so a variable transformer was used for operation. As shown, the example sorting board shown in FIG. 1 was 3D-printed and configured with three gates so that the peanut samples could be directed into four different chutes corresponding to the color of black, brown, orange, and yellow. The gates in this example were operated using a solenoid valve and 3D-printed joints. It can be understood that the sorting board and joints can be fabricated in other manners and the gates may be actuated using other means. Additionally, the sorting board can be extended to accommodate additional chutes for the number grades or colors that are being sorted. In an example, the control box can include a built-in Bluetooth module HC-05 configured to communicate with a computing device (e.g. a smartphone) and the gates to ensure the sorting sequence. For example, when the color of peanut was scanned, the gates can be actuated to direct the peanut to its designated chute. In this example, the microcontroller Arduino Uno was used in this system, although the system for peanut sorting and grading can be implemented and relied upon in other types and configurations of controllers, cameras, and gate actuators. Similarly, a vibratory bowl feeder is one type of a sample feeder and other mechanisms for feeding a sample can be used, as discussed herein.

Figure 2:
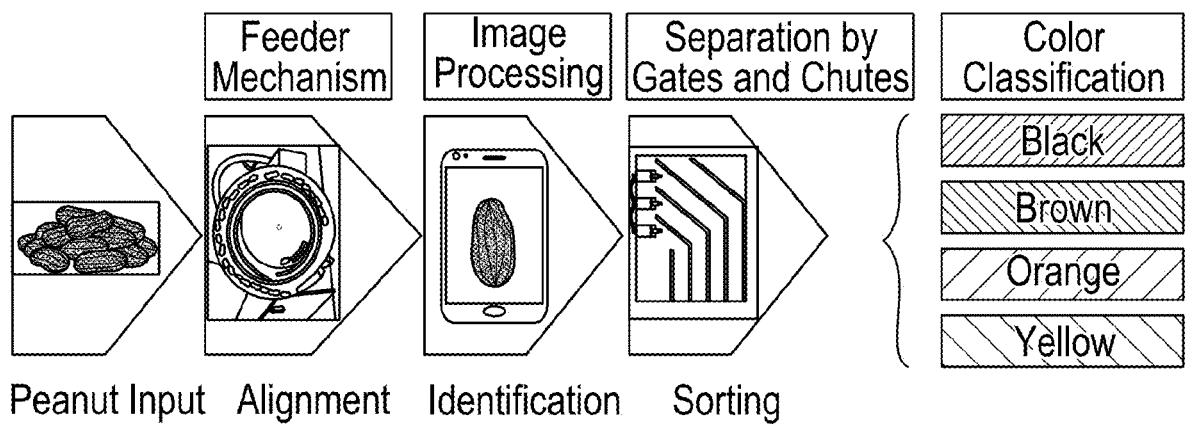
FIG. 2 illustrates an example system of the workflow process of the system for sorting and grading peanuts shown in FIG. 1 according to various embodiments disclosed herein.

Turning to FIG. 2, an illustration of the workflow process is shown. A plurality of peanuts can be placed in a mechanical feeder for alignment of the individual peanuts. The aligned, individual peanuts can be advanced to an imaging area where a digital image can be captured by a camera. The digital image is used to classify the color of the individual peanut. The individual peanut is then advanced to a sorting board where it is automatically sorted and separated into a chute of a plurality of chutes based on the color classification.

Figure 3:
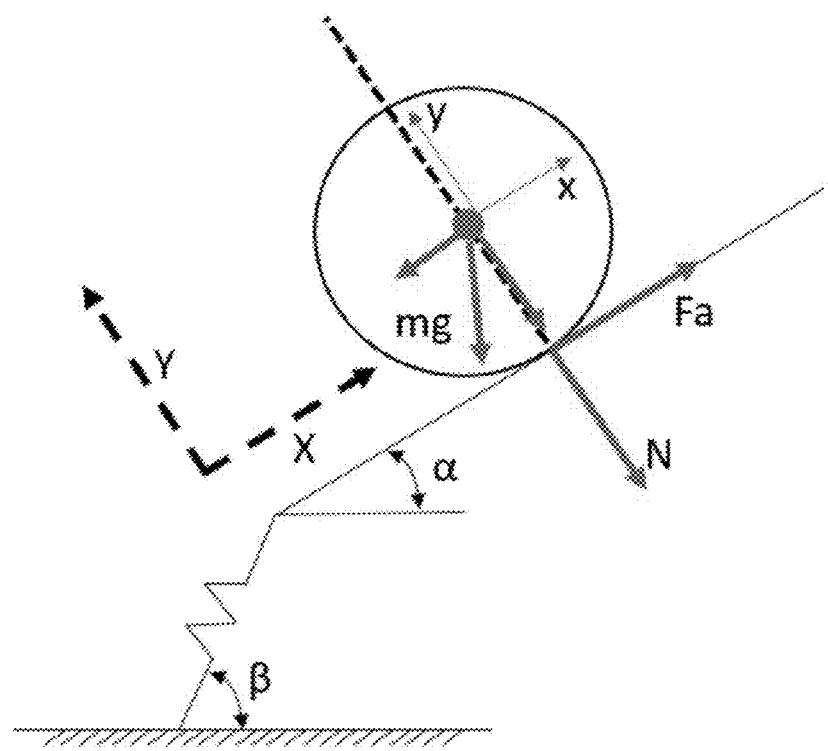
FIG. 3 illustrates an example of a free body diagram of a peanut in a vibratory bowl feeder, one possible method of feeding a sample, according to various embodiments disclosed herein.

In an example, the sample feeder can be a vibratory bowl, as shown in FIG. 1. Initially, all the peanuts were at the bottom of the vibrator, and they gradually climb up the metal track and exit the bowl one by one. Three motions were involved in the process: 1) the peanuts may be rolling with static friction; 2) the peanuts may be moving relative to the track with kinetic friction (sliding motion); 3) the peanuts may not be in contact with the track-hopping motion. Three assumptions were made: the peanut was small enough to be considered as a point mass; the geometry of the individual peanut was cylindrical; no rolling or hopping motion in the vibrational bowl. A kinematic model was derived involving the vibration amplitude and vibration frequency of the feeder (FIG. 3).

The peanut motion on the inclined vibrational plane can be described using equations 1-4:

$$X_{plane} = A \cos \alpha \sin(\omega t) \quad (1)$$

$$a_{xplane} = A(\omega^2)\cos\alpha\sin(\omega t) \quad (2)$$

$$Y_{plane} = A\sin\alpha\sin(\omega t) \quad (3)$$

$$a_{yplane} = A(\omega^2)\sin\alpha\sin(\omega t) \quad (4)$$

Assuming only slide motion happened and the peanut does not leave the track. The equation of motion for peanut can be presented as:

$$\ddot{x} = A(\omega^2)\sin(\omega t)\cos\beta - g\sin\alpha - \frac{F_a}{m_{peanut}} \quad (5)$$

$$\ddot{y} = A(\omega^2)\sin(\omega t)\sin\beta - g\cos\alpha + \frac{N}{m_{peanut}} \quad (6)$$

$$F_a \le \mu N \quad (7)$$

$$N = m_{peanut}g\cos\alpha - Am_{peanut}(\omega^2)\sin\beta\sin(\omega t) \quad (8)$$

In perfect condition, there is no hopping motion, $\ddot{y}=0$ and $N=0$, $$A_{max} = \frac{g\cos\alpha}{(\omega^2)\sin\beta} \quad (9)$$

For pure sliding motion, A must be smaller than $A_{max}$. Now, for the peanut to carry out forward sliding (moving forward along the track), equations (5)-(8) are combined resulting in equation (13).

$$A(\omega^2)\sin(\omega t)\cos\beta > \frac{F_a}{m_{peanut}} + g\sin\alpha \quad (10)$$

$$A(\omega^2)\sin(\omega t)\cos\beta > g\mu\cos\alpha - A(\omega^2)\mu\sin\beta\sin(\omega t) + g\sin\alpha \quad (11)$$

$$\frac{A\omega^2\sin(\omega t)}{g} > \frac{(\mu\cos\alpha + \sin\alpha)}{(\cos\beta + \mu\sin\beta)} \quad (12)$$

$$A > \frac{g(\mu\cos\alpha + \sin\alpha)}{\omega^2\sin(\omega t)(\cos\beta + \mu\sin\beta)} \quad (13)$$

Therefore, in the ideal forward sliding motion, the mass of peanut does not impact the motion, and the four major factors were the amplitude of vibration A, frequency of vibration ω, the vibration angle β, and plane angle α. The coefficient of kinetic friction is around 0.09-0.6. In this example, a vibrational bowl was used to model and determine the motion of the individual peanut, although the design can be implemented and relied upon in other types and configurations of rotational/linear vibrational feeders. Similarly, motion equations can be determined for other sample feeders such as gravitational feeders, conceptual force feeders, mechanical push feeders, and the like, if implemented with the system for peanut sorting and grading.

Figure 4:
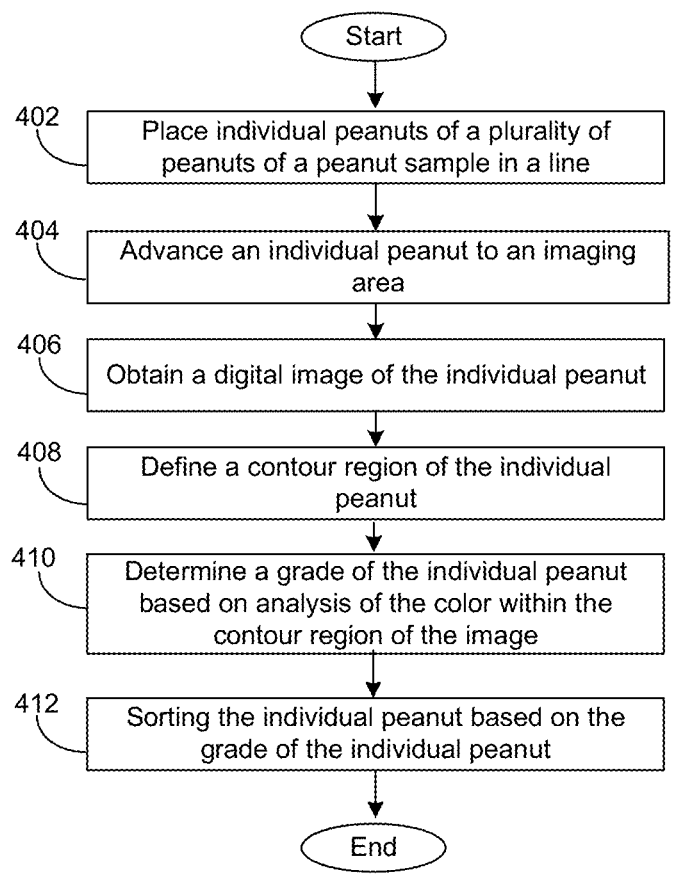
FIG. 4 illustrates an example flowchart of the process of sorting and grading the peanut sample according to various embodiments disclosed herein.

The process of sorting and grading the peanut sample 400 is further described in FIG. 4. A peanut sample comprising a plurality of peanuts from a crop to be harvested can be obtained. Step 402 includes placing the individual peanuts of the plurality of peanuts in a line. As described above, the peanuts can be aligned using a vibratory bowl or other mechanical feeder.

At step 404, the individual peanut can be advanced to an imaging area. The imaging area can have a predetermined background color configured to provide a uniform background in individual images of the individual peanuts such that the contour of the individual peanut can be determined. The imaging area can be considered a transition between the mechanical feeder and the automated sorter.

At step 406, a digital image can be obtained by a digital camera. The digital camera can be a camera configured with data communication to at least one computing device or a computing device comprising a digital camera, such as a mobile device or smartphone. The digital image can be obtained in any format, preferably in a format that can be converted to an HSV (hue-saturation-value) formatted image having hue-saturation-value channels. The digital camera can be positioned above the imaging area using a camera stand or other stationary device configured to obtain an image with the individual peanut within the field of view. The digital camera can be provided by a user and temporarily fixed in place to capture images. The digital camera can be in data communication with the controller of the automated sorter. The data communication can be direct or over a network.

At step 408, a contour region of the peanut can be defined. By analyzing the color within the contour region at step 410, the grade of the individual peanut can be determined. For example, the grade of the peanut can be determined by the image analysis process shown in FIG. 5, which will be described in further detail.

At step 412, the individual peanut can be advanced to the automated sorter. The automated sorter can comprise a sorting board with a plurality of chutes and gates, and a controller configured to actuate the gates to sort the individual peanuts. The controller can be in data communication with the at least one computing device to receive the instruction to actuate a predetermined gate based on the grade or color classification determined for the individual peanut. As can be understood, these steps can be repeated for each peanut of the plurality of peanuts of the peanut sample, with the mechanical feeder advancing each peanut to the imaging area in succession. The individual peanuts of the plurality of peanuts are then sorted into corresponding chutes of the sorting board based on the grade of each individual peanut of the plurality of peanuts. One or more of the steps in this process can be implemented by a software application comprising an image processing method that will be described in further detail.

In a situation where multiple peanuts are in a single image, there could be difficulty for segmentation. In order to solve this, in practice, the field of view of detection can be reduced to a small area rather than the whole photo. The reduced area can also be helpful in color extraction. For example, a small rectangle field of view can be set before the detection area to monitor the HSV value of, for example, a green background. If the value is higher than a pre-set threshold, it could be determined that more than one peanut presented, even they were close to each other, which would also reduce miscounting the peanuts of the peanut sample.

In embodiments the process of sorting and grading may do one or more of the following: analyze the images, assign, calibrate, determine and calculate data and outcome from the images using a trained deep-learning convolutional neural network (DL-CNN) or similar machine learning techniques (Artificial Intelligence). The DL-CNN may be based on models generated by machine learning using a collection of images. In some embodiments, the process of sorting and grading can be configured to interact with one or more remote databases systems that assist in the analysis from the obtained images and additional data. In some embodiments, the images can be saved and further comprise metadata and/or user input data to train, retrain, and/or refine the machine learning model.

Figure 5:
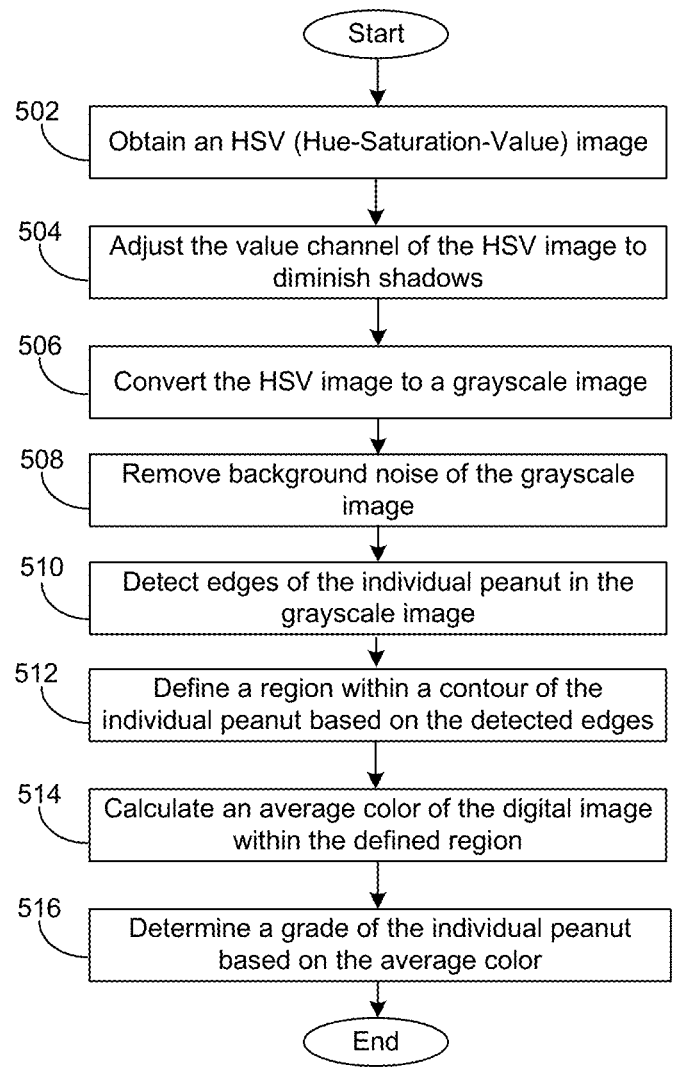
FIG. 5 illustrates an example of an image processing method for sorting and grading the peanut sample according to various embodiments disclosed herein.

Shown in FIG. 5 are example steps of an image processing method 500 of process of sorting and grading 400 to determine the grade of an individual peanut. At step 502, an HSV (hue-saturation-value) image can be obtained. The HSV image can be obtained in that format directly at step 406 of method 400, or pixels of the digital image can be converted for example from an RGB (red-blue-green) values to HSV values (FIG. 6A). At step 504, adjusting the value channel can diminish the shadows cast by the peanut, as depicted in FIG. 6B. Next, at step 506, the HSV MAT can be converted to gray color space, which was a 1-channel image as opposed to 3-channel (FIG. 6C).

At step 508, the background noise can be removed from the image. For example, image blurring or smoothing methods can be used to remove the background noise (FIG. 6D). Some example filtering methods include normalized box, Gaussian, median, and bilateral filters. For the normalized box filter, each pixel value in an image is replaced by the weighted average of the neighborhood (defined by the filter mask) intensity values. The Gaussian filter is a filter whose impulse response is a Gaussian function. The median filter is a non-linear filtering technique, which takes the median of all the under the kernel area and replaces the central element with this median value. In this example, a bilateral filter was chosen among others as it is highly effective in noise removal while keeping edges sharp. Other methods can smooth noise in an image but also blur away the edges, which can reduce the accuracy of the peanut region detected.

At step 510, the edges of the individual peanut cane be detected. As shown in the example in FIG. 6E, the edges can be of the peanut using the Canny function, which used two lower and upper threshold values. If a pixel gradient is higher than the upper threshold, the pixel would be accepted as an edge. If a pixel gradient value is below the lower threshold, then it would be rejected. If the pixel gradient is between the two thresholds, then it would be accepted only if it is connected to a pixel that is above the upper threshold. Choosing the optimal value for the threshold values was crucial to isolate the edges. Manually choosing specific threshold values would give variant results for different images because light intensity, noise, and other conditions differ from image to image. Thus, the OTSU thresholding operation was used, which can automatically detect upper and lower threshold boundaries based on the image conditions. The automatically detected threshold values used in the Canny function resulted in the detection of the edges of the peanut.

At step 512, the contour region of the individual peanut can be defined based on the detected edges. For example, FIG. 6F illustrates an example of the peanut contour. Detecting contours was essential for shape analysis and detection of the region occupied by the peanut within the image. Based on the edges detected from Canny, FindContours function was used to find the contours in the image. The contour retrieval mode was set to CV_RETR_EXTERNAL as it allowed for extracting only the extreme outer contours, which was for isolating the peanut shape. In addition, the Contour approximation method was set to CV_CHAIN_APPROX_NONE as it stored all the contour points, whereas other methods only get the endpoints. Next, the contour of the largest area was isolated and then closed using polylines. The closed contours were then filled with white color using fillPoly. This resulted in the white area corresponding to the peanut's region.

At step 514, the average color within the contour region can be calculated. For example, the mean function can be used to obtain the average color within the identified contour region, as shown in FIG. 6G. At step 516, the grade of the individual peanut can be determined based on the average color calculated. In addition to average color, the image within the contour region may also be analyzed for other physical characteristics or features. For example, the size and area within the contour may be evaluated as well as the graphical information, which may indicate disease. The color, or other features, may also be evaluated within a subregion or specified area of the contour, such as the saddle region of the peanut. Data regarding the grading, physical characteristic, and other identifying or user input data can be saved in a separate data store or with the images for training, retraining, and/or refining the machine learning model.

It can be understood that the system for peanut sorting and grading can be extended beyond peanuts to provide color sorting and grading for a variety of crops. For example, the system for peanut sorting and grading can be adapted for use with nuts, including but not limited to pecans, cashews, and walnuts. Further, the system can be adapted and scaled for use with certain vegetable and fruit crops such as tomato, avocado, cherry, apple, apricot, blueberry, grapefruit, lemon, lime, orange, raspberry, pineapple, plum, strawberry, mango, and the like. It can be understood that the color classification and grading would also be adapted for the specified crop. Similarly, the sample feeder may be adapted appropriately for the specific crop product based on size, weight, and other limitations of the crop product and may be selected from a rotational/linear vibrational feeder, gravitational feeder, conceptual force feeder, mechanical push feeder, and the like.

Figure 7:
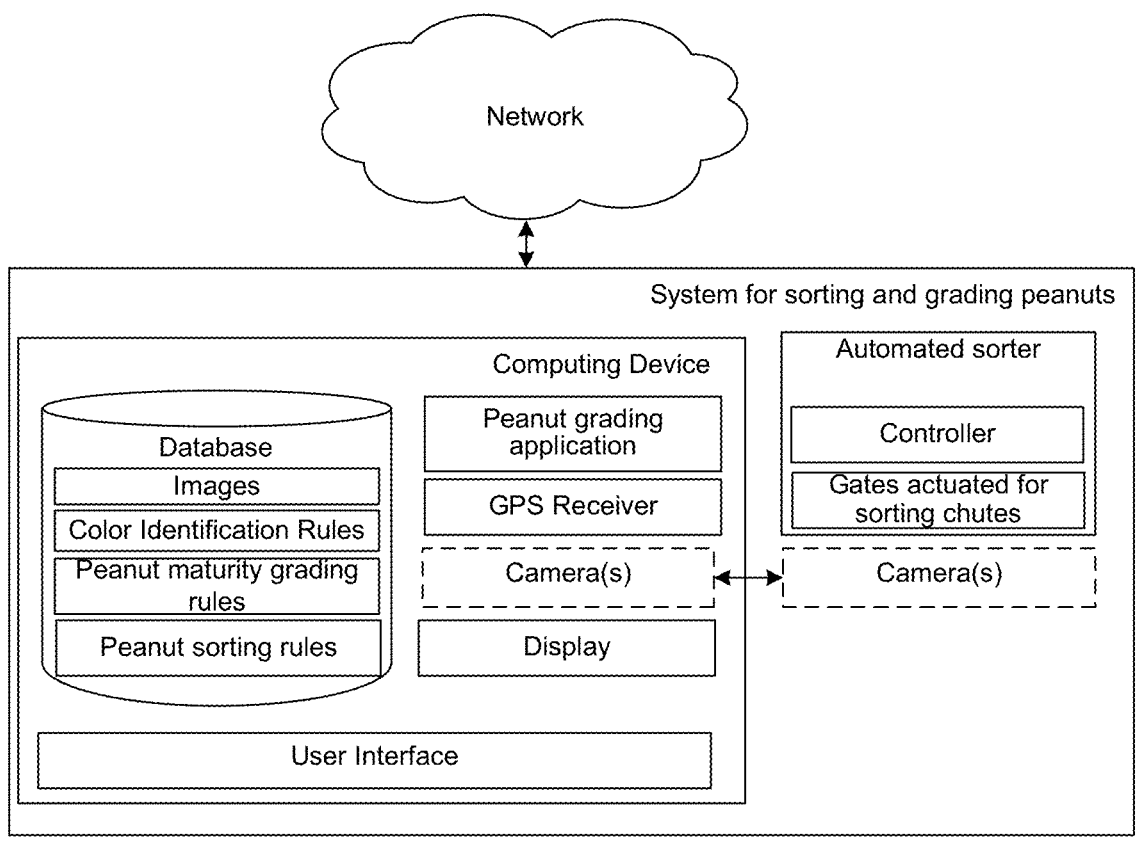
FIG. 7 illustrates an example computing environment according to various embodiments disclosed herein.

As shown in FIG. 7, the system for sorting and grading peanuts can comprise a computing environment comprising at least one computing device and a network. The network is one example of a communications channel and can include the Internet, intranets, extranets, wide area networks (WANs), local area networks (LANs), wired networks, wireless networks, cable networks, satellite networks, other suitable networks, or any combinations thereof. As one example, one or more of the camera, the controller, the at least one computing device, and the computing environment can be respectively coupled to one or more public or private LANs or WANs and, in turn, to the Internet for communication of data among each other. Although not shown in FIG. 1, the network can also include network connections to any number and type of network hosts or devices, such as website servers, file servers, cloud computing resources, databases, data stores, or any other network or computing architectures.

The computing environment can include, for example, a server computer or any other system providing computing capability. Alternatively, the computing environment can employ a plurality of computing devices that can be arranged, for example, in one or more server banks, computer banks, or other arrangements. Such computing devices can be located in a single installation or can be distributed among many different geographical locations. For example, the computing environment can include a plurality of computing devices that together can include a hosted computing resource, a grid computing resource or any other distributed computing arrangement. In some cases, the computing environment can correspond to an elastic computing resource where the allotted capacity of processing, network, storage, or other computing-related resources can vary over time.

The computing environment can administer or interface with the system as described herein. Among other functions, the computing environment can store a database of predetermined values for classifying the color and/or grading the individual peanuts of the peanut sample. The computing environment can also perform one or more steps the process of sorting and grading the peanut sample 400 and/or image processing method 500. Data stored in the database can include, for example, images, color grading rules, lighting calibration rules, maturity analysis rules, dig date and harvest date rules, and potentially other data and rules. The color grading rules and maturity grading rules include rules and/or configuration data for the various algorithms and/or machine learning models used to detect, grade and analyze peanuts in each captured image. The control rules include rules and/or configuration data used to control the various systems such as actuating the gates of the sorting board. The control rules further include rules associated with the functioning and operation of the cameras and controller as well as the sending and receiving of data.

Various applications and/or other functionality may be executed in the computing environment according to various embodiments. Also, various data can be stored in a remote database that is accessible to the computing environment. The data store may be representative of a plurality of data stores as can be appreciated. The data stored in the remote database, for example, is associated with the collection of peanut identification and grading information obtained by analysis or historical data. The data stored in the remote database (e.g. web or cloud database) can also include other data entered by a user (specific peanut type, crop location, water conditions, the peanut size, weight, aroma, disease, etc.), generally accessible data (e.g., GPS data, weather conditions, historical data, etc.). For example, water, soil and weather conditions could be obtained through human data input during grading or national weather/USDA reports. The data stored in the remote database can further be associated with the operation of the various applications and/or functional entities described herein. This system can also be used in conjunction with the PEANUT MATURITY GRADING SYSTEMS AND METHODS as described in U.S. patent application Ser. Nos. 16/561,650 and 17/012,764, which are both incorporated by reference herein.

In the networked environment, the camera, the controller, and the computing environment can communicate data among each other over the network using one or more network transfer protocols or interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof.

Example 1

Three major performance metrics of this system were tested: the transport rate of the peanuts, the counting accuracy, and color sorting accuracy.

From equation 13, there were four major factors influencing the motion of peanuts: the amplitude of vibration A, frequency of vibration, the ω vibration angle β, and plane angle α. In order to obtain an estimate of optimal peanut transport speed, a detailed analysis was conducted using the Excel spreadsheet. Three different types of peanut varieties were used: Runner (21.05 mm), Virginia (30 mm), and Spanish (20.8 mm). The length of the Runner peanut was averaged value, and it will help to determine the transport speed of the Runner peanuts. The coefficient of kinetic friction of the metal track was set to be around 0.09-0.6. One assumption was the back-to-back running of peanuts without any physical separation.

Peanut Sorting Test

A series of tests were conducted to test the peanut detecting and sorting mechanism of the system. First, the Runner peanuts were placed inside the vibratory bowl, moving until being captured by the smartphone camera, then the sorting gate operated to guide the peanuts into different chutes. In this example, a smartphone was used as the camera to capture the digital images and a computing environment to process the digital images, with the smartphone being in data communication with the controller of the automated sorter.

Peanut Counting Analysis

In this example, the system accuracy of counting the number of peanuts passing into the actuated chutes was tested. Further, the color scanning accuracy was evaluated. To minimize errors in testing, the sample peanuts were painted black, brown, orange, and yellow. For each trial, 50 peanuts were selected from over 100 Runner peanuts being used. Combinations of the painted peanuts were selected for three different tests. Three tests were performed to evaluate the color scanning accuracy: a single-color test, a paired-color test, and a mixed-color test.

The single-color test was used to validate the performance of the software application in a setup of one-by-one color detection. This test aimed to validate the performance of the application to classify individual peanut into a maturation class. Three batches of yellow peanuts were used for testing. Each batch had ten peanuts. Similarly, the tests were repeated for brown, black, and orange. The average recall, precision, and F1 score were calculated for each color.

The paired-color test was used to evaluate the performance by using peanuts with similar colors. In order to test the accuracy of the color detection at the color transition region, 20 peanuts with two adjacent colors were tested: yellow and orange, orange and brown, and brown and black.

The mixed-color test was used to simulate the real application by using peanuts with different colors. This aimed to test the performance of the application in mixed samples. Four trials were conducted, and each trial used 50 peanuts of different colors.

Statistical Tool

F1 score was used as a tool to measure the test accuracy.

$$F_1 \text{ score} = 2 \times \frac{\text{Precision} \times \text{recall}}{\text{precision} + \text{recall}} \qquad (6)$$

where precision = how many selected peanuts are relevant recall = how many relevant peanuts are selected Results Peanut Transport Analysis The vibrational frequency was constant, as it largely depended on the material of the vibratory bowl. For example, the variety or type of peanut may vary in size, shape, and/or weight. At least three different varieties of peanuts were evaluated: Runner peanut, Virginia peanut, and Spanish peanut. FIGS. 8A-8D illustrate four different plots that were generated to observe the influence of the vibrational amplitude A (FIG. 8A), the vibration angle β (FIG.

Figure 8A:
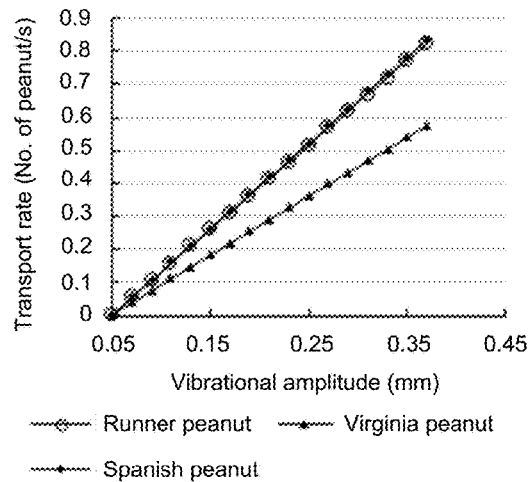
FIGS. 8A-8D illustrate four different plots that were generated to observe the influence of the vibrational amplitude A (FIG. 8A), the vibration angle $\beta$ (FIG. 8B), plane angle $\alpha$, and coefficient $\mu$ on the transport rate (FIG. 8D) according to various embodiments disclosed herein.
Figure 8B:
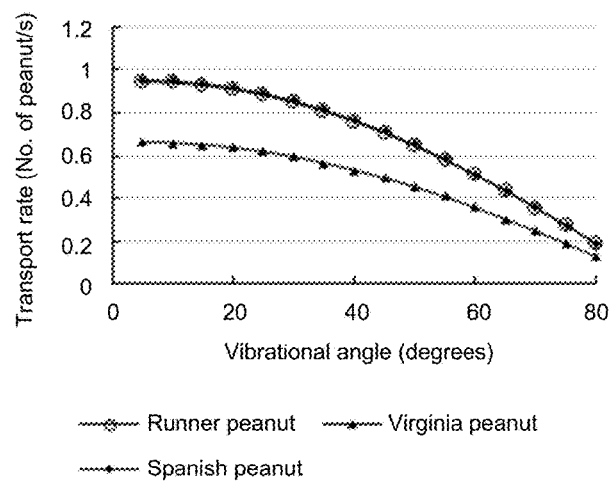
Figure 8C:
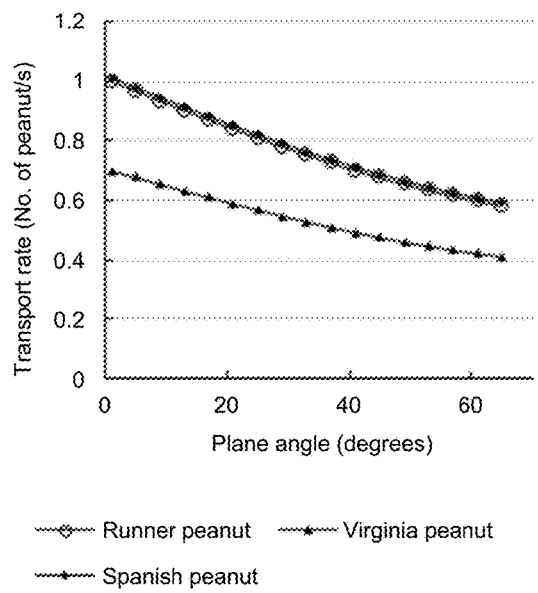
Figure 8D:
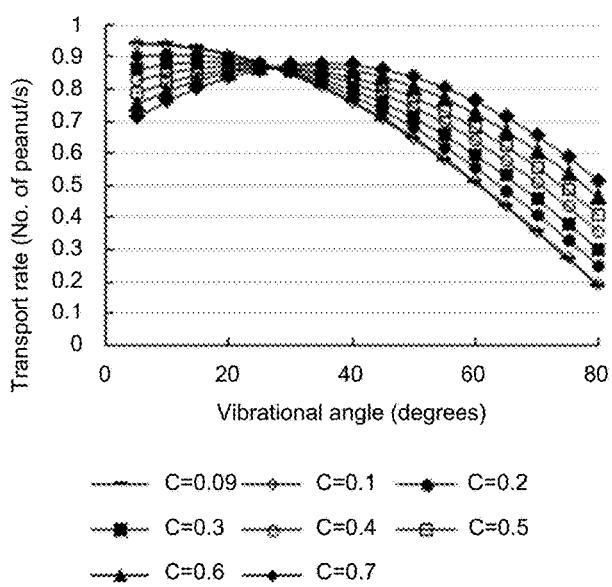

8B), plane angle α, and coefficient μ on the transport rate (number of peanut per second; FIG. 8D), respectively. In each plot, there were three lines corresponding to three different types of peanut: Runner, Virginia, and Spanish. All the results were based purely on computer simulations. For the Runner peanuts, the maximum transport rate is about one peanut per second when the vibration angle β was 5°, the plane angle α was 0, and the coefficient μ was 0.09. Therefore, it would take less than 3.3 min for the vibratory bowl to deliver 200 Runner peanuts to the sorting panel.

Peanut Counting Accuracy

Figure 9:
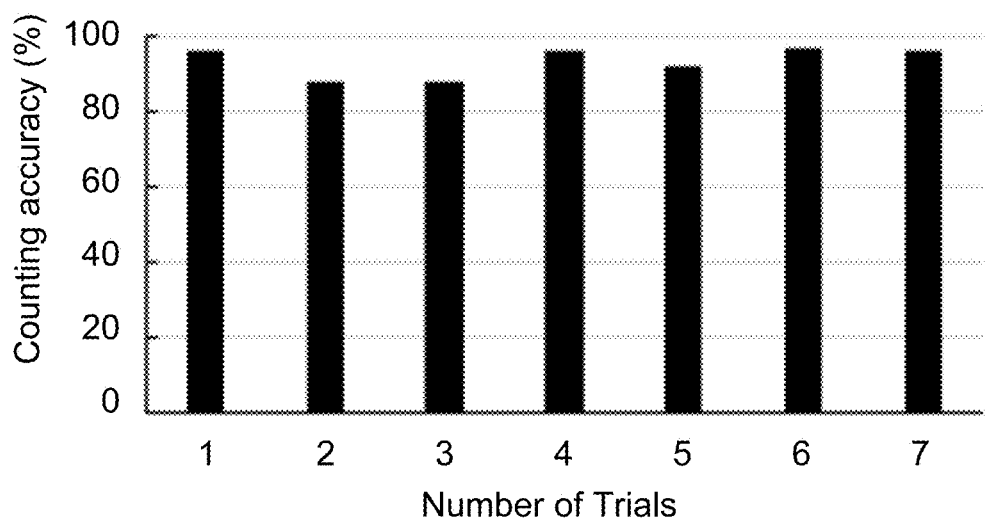
FIG. 9 illustrates the counting accuracy for a number of trials for Example 1 according to various embodiments disclosed herein.

The first test included assessing the ability of the application to detect the number of peanuts scanned. Seven trials were conducted where the accuracies across the trials were found to be above 87%, as shown in FIG. 9.

Peanut Color Sorting Accuracy

Single-Color Test

Figure 10:
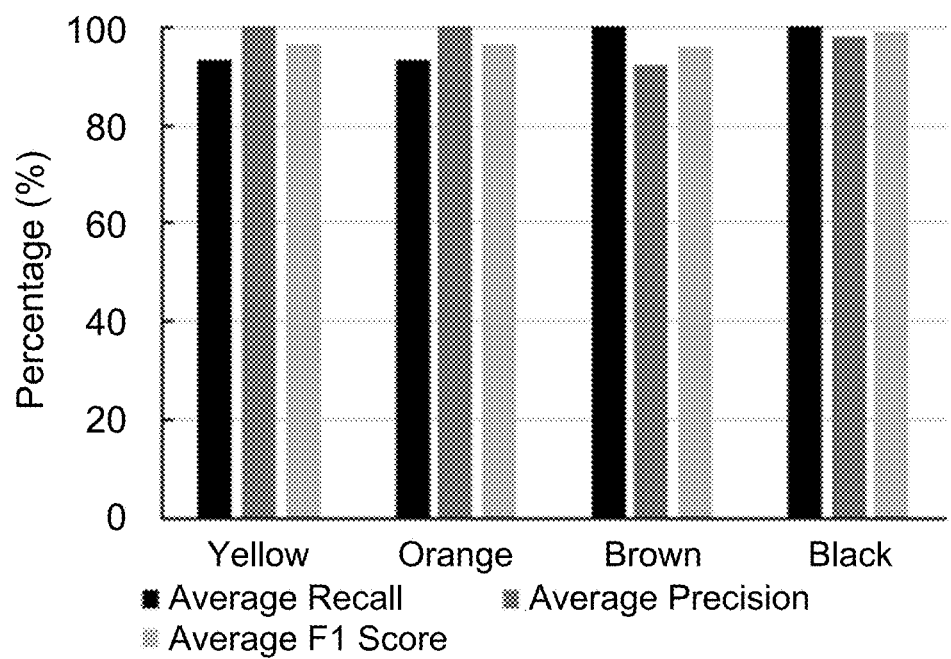
FIG. 10 illustrates the average recall, average precision, and average F1 score for a single-color test for Example 1 according to various embodiments disclosed herein.

In the cases of high recall and low precision, the false positives increased. For instance, peanuts that were not black were detected as black. For yellow and orange, the average recall was lower than precision, showing that some peanuts in each maturity class were missed. Overall, the F1 score was found to be greater than 95% for each maturity class, which indicates there was a good balance between precision and recall (FIG. 10).

Paired-Color Test

Figure 11A:
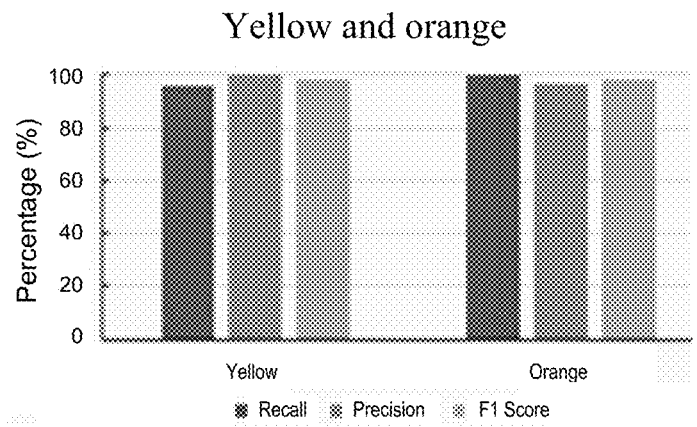
FIGS. 11A-11C illustrate the average recall, average precision, and average F1 score for a paired-color test for Example 1 according to various embodiments disclosed herein.
Figure 11B:
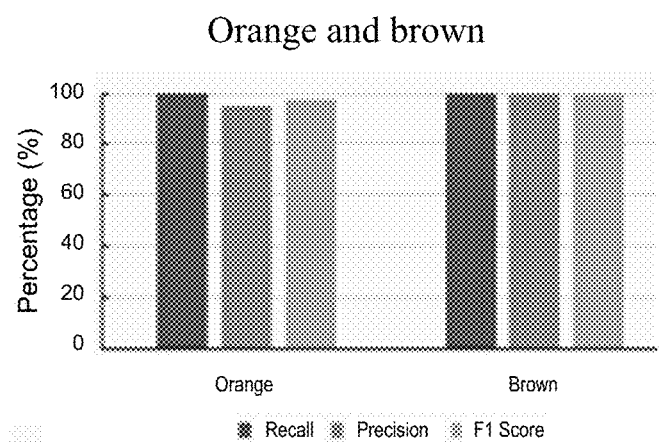
Figure 11C:
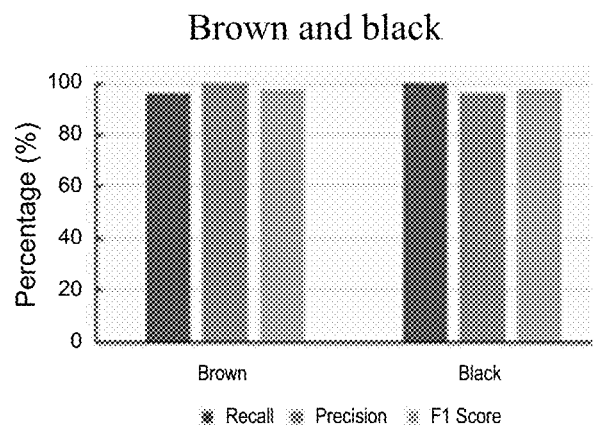

For the yellow and orange peanut test, one orange was detected as yellow and vice versa, showing misclassification. In the brown and orange peanut test, brown had 100% recall and precision, whereas there was one false positive for orange. For a brown and black peanut test, the brown peanuts had one false negative (FIG. 11).

Mixed-Color Test

Figure 12:
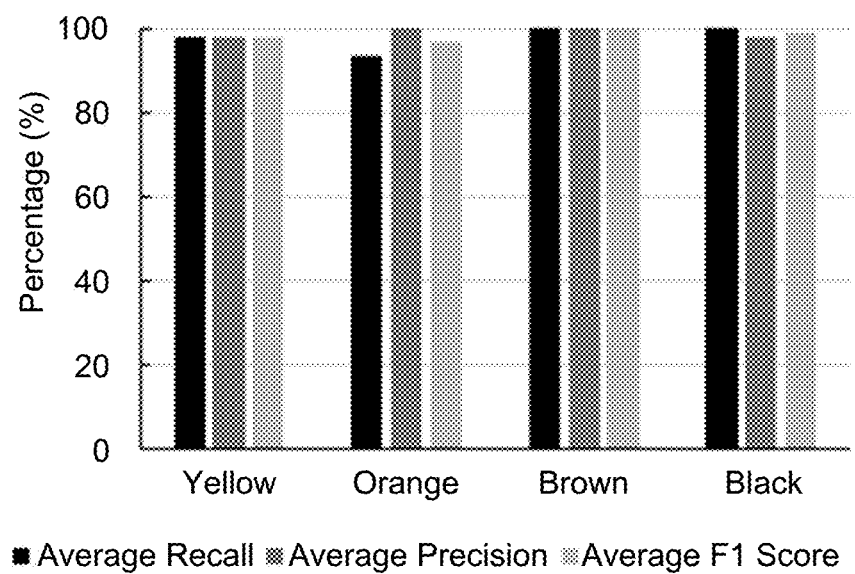
FIG. 12 illustrates the average recall, average precision, and average F1 score for a mixed-color test for Example 1 according to various embodiments disclosed herein.

The brown peanut had the highest percent for all three metrics. The F1 score and recall were found to be the lowest for orange. The smartphone application delivered more than 93% in the recall, the precision, and the F1 score for all the maturation classes (FIG. 12).

Discussion

Peanut Counting Accuracy

Many times, the application missed some peanuts. This could be because the peanut may have been moving too fast in the machine. In one trial, the count was higher than the actual number of peanuts, which could be due to the background noise.

In this example, the system is configured to only select four different categories of peanuts with solid colors: black, orange, brown, and yellow. Surface color could vary from orange to brown, which may be classified as brown. In the field, there is a specific sub-category of peanuts named coal-black peanuts, which is crucial to determine the digging date within three days. Moreover, in a continuous operation, it was observed that one or two peanuts were trapped inside the vibratory feeder for every one hundred peanuts due to abnormal sizes. For example, peanuts with a particular small size could be slow in moving in the vibratory feeder. The current processing rate in this example is one peanut per second, however, this speed could be further optimized for peanut transport and color analysis.

Moreover, the lighting condition is of importance in this design since it could impact the color appearance of the peanut image. For example, under very bright conditions, the background noise would be greater. More background noise can impact the differentiation of matured (black) and immature (non-black) peanuts, generating false-positive results for mature (black) peanuts. However, by removing the background noise before extracting the color of the peanut for classification can effectively solve the problem. In practice, the environmental lighting condition can be more unpredictable than the lab settings. Thus, the dynamic lighting conditions should be considered. Overall, the performed tests showed that the application is generally reliable in detecting peanuts and sorting into different maturation colors. The accuracy of the algorithm to distinguish a peanut from the background and count peanuts in a session was found to be above 87%. Based on the multiple tests done for sorting the peanuts into different colors, the average recall, precision, and F1 score were found to be more than 90% for all of the tests. Some issues were that occasional peanuts were classified into the wrong color class. In addition, some were missed because the peanut may have been moving too fast through the machine resulting in some false negatives.

Overall the metrics show relatively good results, but optimization could increase the robustness and precision of the application. The lighting in the testing environment was consistently showing good results. However, in practical use by farmers, the lighting conditions may vary by location, time of day, etc., and may be different from the lab testing conditions. Thus, additional tests will be performed that replicate the environment in which farmers assess peanut maturity. In addition, the application will be tested for sensitivity in lighting changes and additional updates can be made as needed. Another issue is that the application occasionally misclassified the peanuts when the color classes were close together, such as brown and black. Thus, the color accuracy of the application may also be optimized. The peanuts were tested under four maturity classes. Practically, each color has different shades that correspond to different maturation class and harvest days. Thus, the application is useful for helping determine optimal harvest days depending on the number of peanuts in a particular color/maturity class.

The aim of developing the system is to provide farmers an objective way of classifying the maturity of a peanut sample and getting accurate harvest dates that allow for a higher profit. In the future, further refinements can be made that allow the application to be powerful under lighting changes, precise in classification, and distinguishable over background noise.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A system for grading peanut maturity, comprising:
   a sample feeder, the sample feeder configured to supply individual peanuts of a plurality of peanuts of a peanut sample to an imaging area;
   a sorting board comprising a plurality of chutes and a plurality of gates, each chute of the plurality of chutes designated for a grade of peanut based on color classification;
   a computing device comprising at least one hardware processor; and
   program instructions executable in the computing device that, when executed by the computing device, cause the computing device to:
      obtain a digital image of an individual peanut supplied to the imaging area;
      define a contour region of the individual peanut in the obtained digital image;

analyze an average color of the digital image within the contour region;

determine the grade of the individual peanut by the color classification of the average color within the contour region of the digital image; and sort the individual peanut based on the grade of the individual peanut.

2. The system of claim 1, wherein the digital image of the individual peanut is a Hue-Saturation-Value (HSV) image and the program instructions are further configured to cause the computing device to:

adjust the value channel of the HSV image to diminish shadows;

convert the HSV image to a grayscale image;

remove background noise of the grayscale image;

detect edges of the individual peanut in the grayscale image, the contour region being; within a contour of the individual peanut based on the detected edges; and calculate the average color of the digital image within the defined contour region.

3. The system of claim 1, further comprising a camera positioned to capture the digital image of each individual peanut of the plurality of peanuts of the peanut sample in the imaging area, the camera in data communication with the computing device.

4. The system of claim 1, wherein the program instructions are further configured to cause the computing device to:

determine a designated chute to receive the individual peanut based on the grade of the individual peanut;

determine a gate or a combination of gates to be actuated to deliver the individual peanut to the designated chute.

5. The system of claim 1, wherein the sorting board is positioned on an incline, wherein the imaging area is positioned at the top of the incline, and the individual peanuts move on the incline of the sorting board by gravity.

6. The system of claim 1, wherein the sample feeder is configured to orient in a direction and align the peanuts in a line.

7. The system of claim 1, wherein the sample feeder is a rotational/linear vibrational feeder, a gravitational feeder, a conceptual force feeder, or a mechanical push feeder.

8. The system of claim 1, wherein the computing device comprises a mobile computing device comprising a camera, the mobile computing device positioned to capture the digital image of each individual peanut of the plurality of peanuts of the peanut sample in the imaging area.

9. The system of claim 1, further comprising a controller configured to actuate a combination of gates of the plurality of gates, the controller in data communication with the computing device.

10. The system of claim 9, wherein the controller receives a signal to actuate a gate or a combination of gates, based on the color classification of the individual peanut.

11. An automated method for grading peanut maturity, comprising:

placing individual peanuts of a plurality of peanuts of a peanut sample in a line using a mechanical sample feeder;

feeding an individual peanut to an imaging area;

obtaining a digital image of the individual peanut;

determining a grade of the individual peanut based on an average color within a contour region; and sorting the individual peanut in a chute of a sorting board based on the grade of the individual peanut, the sorting board comprising a plurality of chutes.

12. The method for grading peanut maturity of claim 11, wherein placing individual peanuts of the plurality of peanuts of the peanut sample in a line comprises a sample feeder mechanically ordering the individual peanuts by translational and rotational motion.

13. The method for grading peanut maturity of claim 11, wherein sorting the individual peanut comprises actuating a gate or combination of gates based on the grade of the individual peanut.

14. A method for grading peanut maturity of claim 11, further comprising:

counting a number of individual peanuts of the peanut sample in each grade; and determining a number of days remaining until harvest.

15. A method for grading peanut maturity of claim 11, wherein determining a grade of the individual peanut based on the average color comprises:

obtaining a digital image of the individual peanut;

diminishing shadows in the digital image;

converting the digital image to a grayscale image;

removing background noise from the grayscale image;

detecting edges in the grayscale image;

obtaining a contour; and extracting color value within the contour of the individual peanut.

16. A method for grading peanut maturity of claim 11, wherein determining a grade of the individual peanut based on the average color comprises:

obtaining an HSV image of an individual peanut, the HSV image having hue-saturation-value (HSV) channels;

adjusting the value channel of the HSV image to diminish shadows;

converting the HSV image to a grayscale image;

removing background noise of the grayscale image;

detecting edges of the individual peanut in the grayscale image;

defining a region within a contour of the individual peanut based on the detected edges; and calculating an average color of the digital image within the defined region.

17. A method for grading peanut maturity of claim 11, wherein obtaining a digital image comprises:

capturing an RGB image comprising pixels having red-blue-green (RGB) channels;

converting the RGB channels of the pixels to hue-saturation-value (HSV) channels to obtain an HSV image.

18. A method for grading peanut maturity of claim 11, further comprising:

determining a grade of the individual peanut of each digital image of a plurality of digital images;

counting individual peanuts in each grade; and generating a target harvest day or date range based on a number of peanuts in each grade of the peanut sample.

19. A non-transitory computer-readable computer product comprising program code executable in one or more computing devices that, when executed, directs the one or more computing devices to:

capture a digital image of an individual peanut, the digital image being an RGB image comprising pixels having red-blue-green (RGB) channels;

convert the RGB values of the pixels to hue-saturation-value (HSV) channels to obtain an HSV image;

adjust the value channel of the HSV image to diminish shadows;

convert the HSV image to a grayscale image;

remove background noise of the grayscale image;

detect edges of the individual peanut in the grayscale image;

define a region within a contour of the individual peanut based on the detected edges;

calculate an average color of the digital image within the defined region; and determine a grade of the individual peanut based on the average color.

20. A non-transitory computer-readable computer product of claim 19, wherein the program code further causes the one or more computing devices to:

signal a controller to actuate a gate based on the grade of the individual peanut.

\* \* \* \* \*